United States Patent [19]

Eguchi

[11] Patent Number: 4,849,881
[45] Date of Patent: Jul. 18, 1989

[54] DATA PROCESSING UNIT WITH A TLB PURGE FUNCTION

[75] Inventor: Kazutoshi Eguchi, Tokyo, Japan

[73] Assignee: Kabushiki Kaisha Toshiba, Kawasaki, Japan

[21] Appl. No.: 664,293

[22] Filed: Oct. 24, 1984

[30] Foreign Application Priority Data

Oct. 26, 1983 [JP] Japan .................. 58-200224

[51] Int. Cl.⁴ .................. G06F 9/22; G06F 12/10
[52] U.S. Cl. .................................... 364/200
[58] Field of Search ... 364/200 MS File, 900 MS File

[56] References Cited

U.S. PATENT DOCUMENTS

| | | | |
|---|---|---|---|
| 4,004,278 | 1/1977 | Nagashima | 364/200 |
| 4,068,303 | 1/1978 | Morita | 364/200 |
| 4,145,738 | 3/1979 | Inoue et al. | 364/200 |
| 4,400,774 | 8/1983 | Toy | 364/200 |
| 4,467,414 | 8/1984 | Akagi et al. | 364/200 |
| 4,481,573 | 11/1984 | Fukunaga et al. | 364/200 |
| 4,654,777 | 3/1987 | Nakamura | 364/200 |

FOREIGN PATENT DOCUMENTS 54-14458 6/1979 Japan .
56-107377 8/1981 Japan .

*Primary Examiner*—Gareth D. Shaw
*Assistant Examiner*—Christina M. Eakman
*Attorney, Agent, or Firm*—Cushman, Darby & Cushman

[57] ABSTRACT

A data processing unit with a TLB purge function has an address counter in which TLB purge data including an address space identifier, segment number, and page number are held. In TLB purge processing, A TLB is indexed by the upper data from the counter so that for the contents of the corresponding entry, an upper address space identifier, an upper segment number, an upper page number, and a valid flag are connected to a TLB hit detector. The lower data from the counter and three mask bits of a nano-instruction are also connected to the TLB hit detector. The TLB hit detector includes three comparators which compare the upper address space identifiers, the upper segment numbers, and the upper page numbers, which are respectively derived from the counter and the TLB. The result of each comparison and a mask bit are ORed. The ORed signal and the valid flag are supplied to an AND gate, thereby checking whether the TLB hit is present or not. When the TLB hit is detected, a write clock signal is generated, and the valid flag of the corresponding entry in the TLB is reset. The counter is incremented when the unit is operated in any mode other than single purge mode. The incrementing continues until the bits in that field of the counter which corresponds to a specified TLB purge processing mode are all 1's.

20 Claims, 4 Drawing Sheets

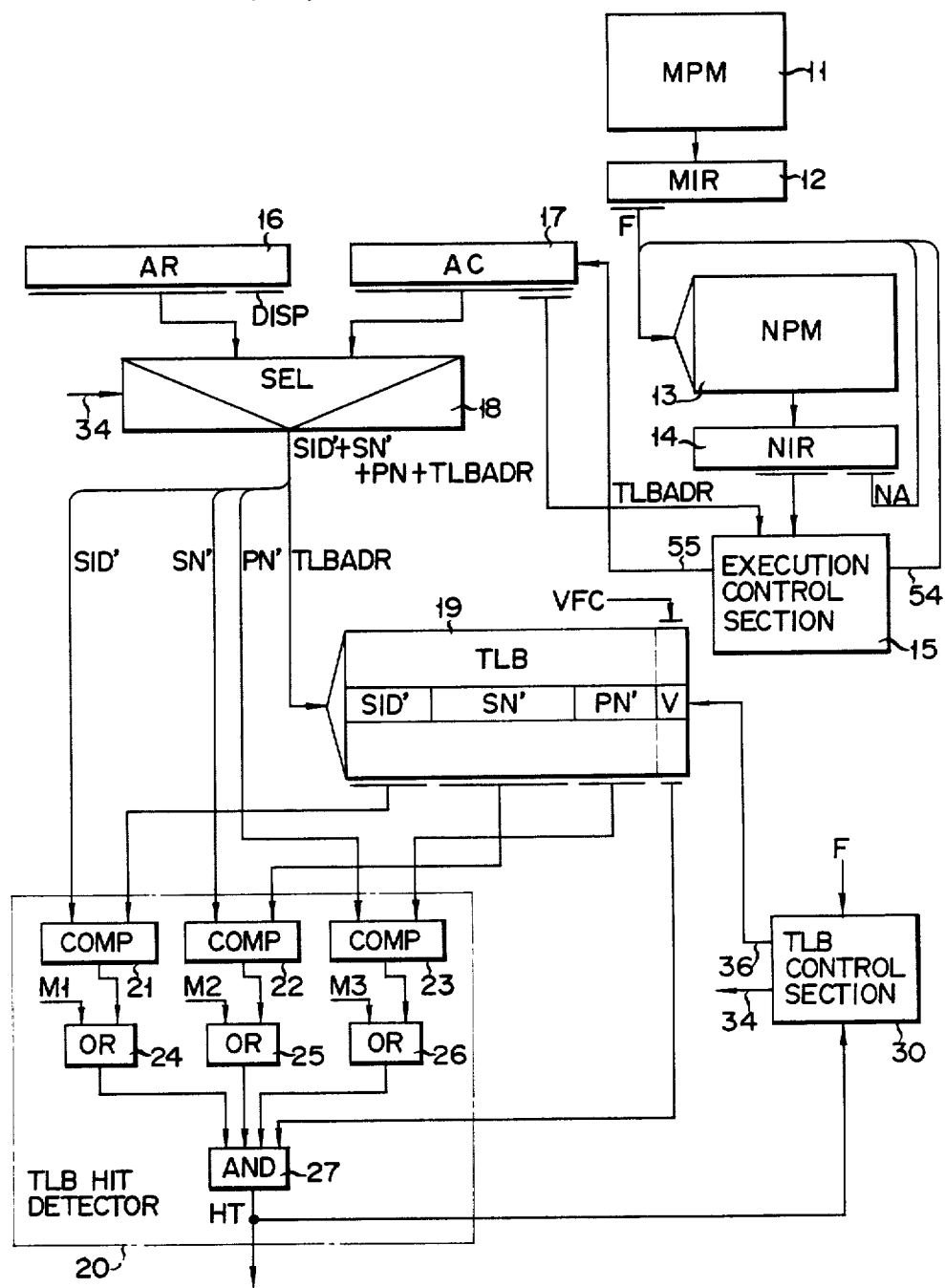
F I G. 1

DATA PROCESSING UNIT WITH A TLB PURGE FUNCTION

BACKGROUND OF THE INVENTION

The present invention relates to a data processing unit with a TLB (translation lookaside buffer) for making an address translation from a virtual address to a real address at a high speed, and the present invention further relates to a data processing unit having a TLB purge function.

In a data processing unit (DPU) with a TLB, in order to translate an address from a virtual address to a real address, the real address data is prepared using a segment table and a page table stored in a main memory. The real address data is stored into a TLB. Therefore, subsequent address translation can be carried out by referring to the real address data in the TLB, so long as it is stored therein. In this respect, the addressing can be sped up because there is no need to refer to the various tables in the main memory.

In a computer with a TLB-contained data processing unit of, for example, the multiple virtual storage control type, changing of an executed address space, purging of the entire segment from the main memory, and purging of a certain page assigned to the main memory are frequently required. To this end, the conventional DPU invalidates all of the entries in the TLB, thereby inhibiting the corresponding segment or page from being subsequently accessed. When new TLB entries are prepared for a new executed address space after the address space is changed, the conventional DPU invalidates the new TLB entries. To crepe with this problem, the DPU computes an address and loads the corresponding real address data into the TLB.

In most cases, after the executed space is changed, the main memory of the computer still stores the segment or the page corresponding to the virtual address space, i.e., the address space which is no longer an executed address space as a result of the change in the address space. As described above, all of the entries in the TLB are invalid. If the virtual address space returns to the executed address space and it is necessary to access the segment or the page which originally is not required to be invalidated, the DPU must prepare another real address data again and load it into the TLB, as in the above case. Accordingly, address translation for translating a virtual address into a real address is deteriorated in translation.

To solve this problem, it is necessary to select specific entries from those in the TLB and make them invalid. Such an approach is disclosed in, for example, Japanese Patent Disclosure (Kokai) No. 56-107377, K. Miyazaki et al., Aug. 26, 1981. The Kokai invention refers merely to the fact that, for example, when a page fault occurs, it is desirable to select only the corresponding entries of the TLB and make them invalid. The Kokai invention, however, does not refer to any specific means to do the same. Further, to select the specific entries and make them invalid, it is necessary to specify a segment and a page and to invalidate the TLB entries every time invalidation of the entries is required. This consumes much time and remarkably deteriorates the efficiency of TLB purge processing.

SUMMARY OF THE INVENTION

Accordingly, an object of the present invention is to provide a data processing unit with a TLB purge function which, when a segment or a page is purged from a main memory, can effectively invalidate only the corresponding entries in a TLB.

Another object of the present invention is to provide a data processing unit with a TLB purge function which, at the time of changing an executed address space, can effectively invalidate only the corresponding entries in a TLB.

To achieve the above objects, there is provided a data processing unit with a TLB purge function, which is provided with a TLB containing a plurality of entries, each of which further contains a valid flag indicating whether or not a corresponding entry is valid or not, and real address data. The DPU is made up of a first register means, which in accessing a memory holds a virtual address consisting of fields for a first segment number, a first page number, and displacement, as well as a second register means with a counter function. In TLB purge processing in according with the present invention, TLB purge data including a second segment number and a second page number is initially set in the second register means. The second register means is controlled by updating a control means provided in the DPU, under the condition specified for TLB purge processing. As a result, part of the TLB purge data is updated.

The DPU further includes a select means for selecting either item of data except for the displacement from the first register means or the output data from the second register means. The TLB is indexed by a predetermined field of the data output from the select means. Additionally, the DPU includes a field-specifying means for specifying at least a portion of a predetermined field of the real address data read out of the TLB and at least a portion of the field of output data of the select means other than said predetermined field, a TLB hit detecting means, and a TLB control means. The TLB hit detecting means detects the coincidence between the fields specified by the field-specifying means or the portions thereof. On the basis of the detected result and a validity-specifying flag from the TLB, the TLB hit detecting means checks whether the real address data from the TLB is an intended real address data or not. When the TLB hit detecting means detects that the real address data is the intended one and that the DPU is in a TLB purge processing mode, the TLB control means invalidates the validity-specifying flag in the corresponding entry in the TLB, thereby invalidating the intended entry.

BRIEF DESCRIPTION OF THE DRAWINGS

FIG. 1 is a block diagram of a data processing unit with a TLB purge function, which is an embodiment of the present invention;

DETAILED DESCRIPTION OF THE PREFERRED EMBODIMENTS

Reference is made to FIG. 1 illustrating a configuration of a data processing unit (DPU) with a TLB purge function, and which is an embodiment of the present invention. The DPU shown in FIG. 1 is applied to a multiple virtual storage control type computer. In FIG. 1, a microprogram memory (MPM) 11 stores various microprograms each consisting of a series of microinstructions. A microinstruction read out of the MPM 11 is loaded into a microinstruction register (MIR) 12. A function field F of the microinstruction from the MIR 12 designates various processings and the upper order addresses of a nano-program memory (NPM) 13. The NPM 13 stores various types of nano-programs each consisting of a series of nano-instructions.

Figure 2:
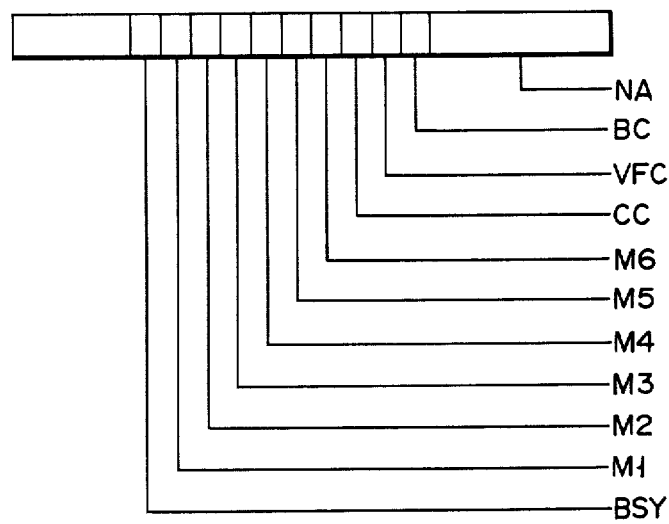
FIG. 2 shows a format illustrating a major part of a nano-instruction used in the DPU of FIG. 1.

A nano-instruction read out of the NPM 13 is held in a nano-instruction register (NIR) 14. As shown in FIG. 2, the nano-instruction contains a nano-address field NA for designating the lower order address of an address (NPM address) of the next nano-instruction to be executed, a branch control bit BC, a valid flag control bit VFC, a counter control bit CC, mask bits M1–M6, and a busy bit BSY. The NIR 14 is connected to an execution control section 15 to control the execution of a nano-instruction. The execution control section 15 controls the addressing of the NPM 13 and the clocking of an address counter (AC) 17, to be described later, with specific bits of the nano-instruction output from the NIR 14.

Figure 3:
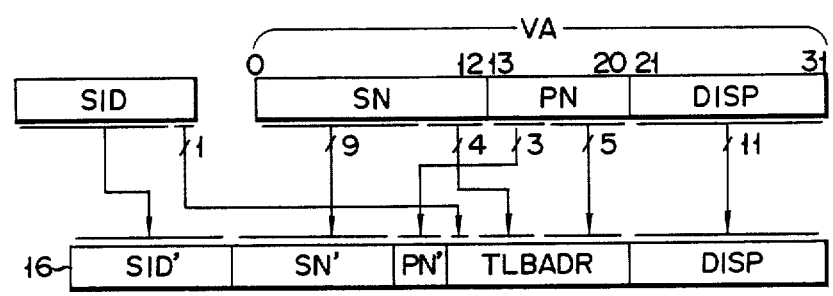
FIG. 3 illustrates data consisting of an address space identifier and a virtual address when set in an address register (AR) in the DPU of FIG. 1.

The DPU of FIG. 1 further includes an address register (AR) 16 for holding an address space identifier SID as an identifying number for identifying one of multiple virtual address spaces and a virtual address VA indicating a memory location in a virtual storage. As shown in FIG. 3, the virtual address VA of 32 bits consists of a segment number SN (13 bits), a page number PN (8 bits), and an in-page offset value, i.e., a displacement DISP (11 bits). The data held in the AR 16 is allocated from upper data to lower data as follows: an upper order space identifier SID', an upper order segment number SN', an upper order page number PN', a TLB (translation lookaside buffer) address TLBADR, and a displacement DISP, as shown in FIG. 3. The upper order space identifier SID' consists of the bits of the space identifier SID other than the lower bit (not limited to one bit). The upper order segment number SN' consists of the bits (9 bits) of the segment number SN other than the lower four bits (not limited to four bits). The upper order page number PN' consists of the bits (3 bits) of the page number PN other than the lower five bits (not limited to five bits). The TLB address TLBADR consists of the least significant bit (LSB) of the space identifier SID, the lower four bits of the segment number SN, and the lower five bits of the page number PN.

Figure 4:
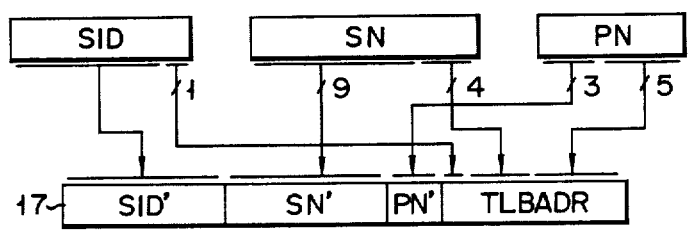
FIG. 4 illustrates TLB purge data in an address counter (AC) of the DPU of FIG. 1.

The DPU of FIG. 1 includes an address counter (AC) 17. In TLB purge processing for purging intended entries from a TLB 19 (to be described later), i.e., for invalidating intended entries in the TLB 19, TLB purge data is initially set in the AC 17. As shown in FIG. 4, the TLB purge data consists of a space identifier SID, a segment number SN, and a page number PN and specifies an area to be subjected to TLB purge processing. The data held by the AC 17 is allocated from upper data to lower data as follows: the upper order space identifier SID', the upper order segment number SN', the upper order page number PN', and the TLB address TLBADR, as shown in FIG. 4. The AC 17 is also used for replacing the entries in the TLB 19. This replacing processing is called TLB replace processing. In this processing, the data set in the AC 17 has the same structure as that of the TLB purge data.

The data (SID'+SN'+PN'+TLBADR) except for the displacement DISP which is output from the AR 16, is supplied to a selector 18. The output data (SID'+SN'PN'+TLBADR) from the AC 17 is also connected to the selector 18. According to a signal 34, the selector 18 selects either item of output data except for the displacement DISP from the AR 16 or the output data from the AC 17. The signal 34 is derived from a TLB control section 30. Of the output data (SID'+SN'+PN'TLBADR) from the selector 18, only the TLB address TLBADR is connected to the TLB 19. The TLB 19 is addressed by the TLB address TLBADR from the selector 18. Each entry in the TLB 19 consists of a field for real address data containing an upper order space identifier SID', an upper order segment number SN', an upper order page number PN', and a field for a bit to indicate whether or not the entry is valid. (This bit is called a valid flag V.) V=1 indicates that the corresponding entry is valid. V=0 indicates that the entry is invalid. For rewriting the valid flag V, a valid flag control bit VFC of a nano-instruction is used. In the illustration of the entry of the TLB 19 shown in FIG. 1, there the field of a page frame number, which is also one of the items of data constituting the real address data, is omitted.

Of the data read from the TLB 19, the upper order space identifier SID', the upper order segment number SN', the upper order page number PN', and the valid flag V are supplied to a TLB hit detector 20. Of the select output data (SID'+SN'+PN'+TLBADR) from the selector 18, the upper order space identifier SID', the upper order segment number SN', and the upper order page number PN' are also supplied to the TLB hit detector 20. Mask bits M1–M3 in the nano-instruction derived from the NIR 14 are also supplied to the TLB hit detector 20. The TLB hit detector 20 is comprised of comparators 21–23, OR gates 24–26, and an AND gate 27. The upper order space identifiers SID' from the selector 18 and the TLB 19 are coupled with the COMP 21. The upper order segment numbers SN' from those circuit sections are coupled with the COMP 22. The upper order page numbers PN' from those circuit sections are supplied to the COMP 23. The COMP 21 compares the upper order space identifiers SID' to detect their coincidence. The COMP 22 compares the upper order segment numbers SN' to detect their coincidence. Similarly, the COMP 23 compares the upper order page number PN' to detect the coincidence thereof. The output signal (coincidence signal) from the COMP 21, together with the mask bit M1 from the NIR 14, is supplied to the OR gate 24. The output signal from the COMP 22, together with the mask bit M2 from the NIR 14, is supplied to the OR gate 25. The output signal from the COMP 23, together with the mask bit M3 from the NIR 14, is supplied to the OR gate 26. The output signals from the OR gates 24–26, together with the valid flag V from the TLB 19, is supplied to the AND gate 27. The output signal from the AND gate 27 is used as a TLB hit signal HT indicating whether or not the corresponding real address data is stored in the TLB 19, i.e., whether the TLB is hit or not.

Figure 5:
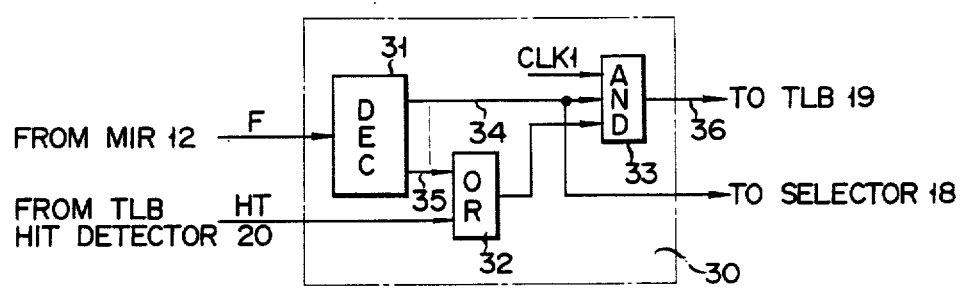
FIG. 5 is a block diagram of a TLB control section in the DPU of FIG. 1.

A TLB hit signal HT from the TLB hit detector 20, more exactly from the AND gate 27 therein, is connected to the TLB control section 30. The function field F from the MIR 12 is also applied to the TLB control section 30. The TLB control section 30 includes a decoder (DEC) 31, an OR gate 32, and an AND gate 33. The function field F from the MIR 12 is connected to the DEC 31, as shown in FIG. 5. The DEC 31 decodes the field F and produces control signals for TLB control, such as signals 34 and 35. The signal 34 indicates whether rewriting of the TLB 19 is required or not and is used as a select control signal for the selector 18. The signal 35 indicates whether or not the rewriting of the TLB 19 is caused by the TLB replace processing. The signal 35 from the DEC 31, together with the TLB hit signal HT from the TLB hit detector 20, is connected to the OR gate 32. The output signal from the OR gate 32 is supplied to the AND gate 33, together with the signal 34 from DEC 31 and a clock signal CLK1 which determines the timing of writing data into the TLB 19. The output signal 36 from the AND gate 33 is used as a write control signal to the TLB 19. The period of the clock signal CLK1 is equal to that of the execution of the nano-program.

Figure 6:
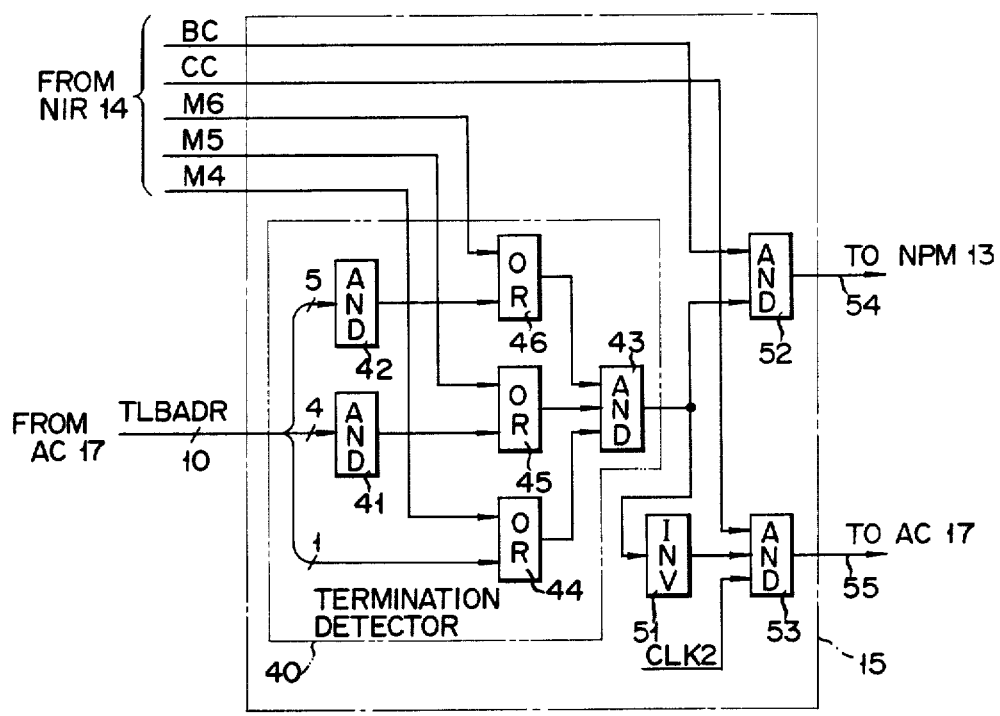
FIG. 6 is a block diagram of an execution control section in the DPU of FIG. 1.

FIG. 6 shows a circuit arrangement of the execution control section 15. The execution control section 15 is made up of a termination detector 40 for detecting whether the termination condition of a nano-program (in this example, a nano-program for TLB purge processing) holds or not, an inverter (INV) 51, and AND gates 52 and 53. The termination detector 40 includes AND gates 41-43 and OR gates 44-46. Of the output data (SID'+SN'+PN'+TLBADR) from the AC 17, the TLB address TLBADR (10 bits) is applied to the termination detector 40 in the execution control section 15. The lower 5 bits of the TLB address TLBADR supplied to the termination detector 40 are supplied to the AND gate 42, and the succeeding 4 bits are supplied to the AND gate 41. The remaining bit of the TLB address TLBADR, i.e., the most significant bit, is connected to the OR gate 44, together with the mask bit M4 from the NIR 14. The output signal from the AND gate 41, together with the mask bit M5 from the NIR 14, is supplied to the OR gate 45. The output signal from the AND gate 42, together with the mask bit M6 from the NIR 14, is connected to the OR gate 46. The output signals from the OR gates 44-46 are used to indicate whether or not the above termination condition holds.

The output signal from the AND gate 43 is supplied to the AND gate 52, together with a branch control bit BC from the NIR 14. The output signal 54 from the AND gate 52 is used as part of the address in the NPM 13. The address of the NPM 13 is represented by the linking data of a function field F from the MIR 12, the output signal 54 from the AND gate 52 in the execution control section 15, and a nano-address field NA from the NIR 14. The output signal from the AND gate 43 is also supplied to the INV 51. The output signal from the INV 51 is supplied to the AND gate 53, together with a counter control bit CC from the NIR 14 and a clock signal CLK2 to determine the timing of incrementing the contents of the AC 17. The output signal 55 from the AND gate 53 is supplied to the clock terminal of the AC 17. The period of the clock signal CLK2 is equal to the period of the execution cycle of the nano-program.

For explaining the operation of the DPU as mentioned above, memory access will be described by way of example. It is assumed that a microinstruction that accesses a memory is read out of the MPM 11 and is loaded into the MIR 12. The function field F of the microinstruction loaded in the MIR 12 is supplied to a microinstruction decoder (not shown). The microinstruction decoder decodes the function field F from the MIR 12 to generate various control signals to control the related circuits, as is well-known. In the case of the microinstruction that accesses memory, like this case, a memory address (virtual address VA) is loaded into the AR 16.

The function field F in the microinstruction loaded in the MIR 12 is also supplied to the DEC 31 in the TLB control section 30. The DEC 31 decodes the function field F from the MIR 12. When the function field F designates the TLB purge processing mode, the DEC 31 produces the signal 34 of logic 1 and the signal 35 of logic 0. When the function field F designates the TLB replace processing mode, the signals 34 and 35 produced from the DEC 31 both take the logical state of 1. When it designates a processing mode other than the TLB purge processing mode or the TLB replace processing mode, the signals 34 and 35 are both logic 0. In this example designating the memory access, the signals 34 and 35 derived from the DEC 31 are both logic 0. When the signal 34 is logic 0, the AND gate 33 is disabled to prohibit the clock signal CLK1 from being output as a write control signal 36 for the TLB 19.

The signal 34 of logic 0 derived from the DEC 31 in the TLB control section 30 is supplied to the selector 18. When the signal 34 is logic 0, as in this case, that is, the DPU is not in the rewriting mode for rewriting the TLB 19, the selector 18 selects the data (SID'+SN'+PN'+TLBADR) supplied from the AR 16, not the data (SID'+SN'+PN'+TLBADR) supplied from the AC 17. Of the data from the AR 16 selected by the selector 18, the TLB address TLBADR is supplied to the TLB 19. The TLB 19 is indexed by the TLB address TLBADR so that the contents of the entry in the TLB 19 as specified by the TLB address TLBADR is taken out. The upper order space identifier SID', the upper order segment number SN', the upper order page number PN', and the valid flag V, which are contained in the entry indexed from the TLB 19, are supplied to the TLB hit detector 20. Of the data supplied from the AR 16 selected by the selector 18, the data (SID'+SN'+PN') except the TLB address TLBADR is also supplied to the TLB hit detector 20.

The COMP 21 in the TLB hit detector 20 checks whether or not the upper order space identifier SID' from te selector 18 is coincident with the upper order space identifier SID' from the TLB 19. The COMP 22 in the TLB hit detector 20 checks as to whether or not the upper order segment number SN' from the selector 18 is coincident with the upper order segment number SN' from the TLB 19. The COMP 23 checks as to whether or not the upper order page number PN' from the selector 18 is coincident with the upper order page number PN' from the TLB 19. The COMPs 21-23 each produce logic 1 when those corresponding items of data are coincident with each other and produces logic 0 when they are not. The output signals from the COMPs 21-23 are supplied to the OR gates 24-26. The mask bits M1-M3 are supplied from the NIR 14 to the OR gates 24-26. The mask bits M1-M3 are logic 0 in processing modes other than the TLB purge processing mode and the TLB replace processing mode. In this example where the memory access mode is specified, the mask bits M1-M3 are logic 0. The logic level of the output signal from the OR gate 24 is coincident with that of the output signal from the COMPs 21-23. The output signals from the OR gates 24-26, together with the valid flag V from the TLB 19, are supplied to the AND gate 27.

The AND gate 27 produces a TLB hit signal HT of logic 1 when the output signals from the OR gates 24-26 and the valid flag V from the TLB 19 are all logic 1. The same produces a TLB hit signal HT of logic 0 when any one of those signals is logic 0. In this example where the memory access is designated, the TLB hit signal HT is logic 1 when the output signals from the COMPs 21-23 and the valid flag V from the TLB 19 are all logic 1. This indicates that, in the memory access mode, the check or detection results by the COMPs 21-23 and the state of the valid flag V are all evaluated by the AND gate 27. When the TLB hit signal HT derived from the AND gate 27 of the TLB hit detector 20 is logic 1 in the memory access mode, the page frame number, which is one of the items of data constituting the real address data contained in the entry indexed from the TLB 19, is linked with the displacement DISP in the virtual address VA loaded in the AR 16, thereby obtaining a real address. When the TLB hit signal HT is logic 0, the real address data is formed by using the segment table and the page table stored in the main memory. The real address data is registered in the corresponding entry in the TLB 19 by the TLB replace processing to be given below.

The TLB purge processing operation of the DPU will be described with reference to FIG. 7 which shows a memory map. This embodiment employs four types of microinstructions M(1)-M(4) to designate the TLB purge processing mode. The microinstruction M(1) directs to invalidate an entry in the TLB 19 corresponding to a page in a specific segment in a specific virtual address space. This validating operation is called a single purge. The microinstruction M(2) invalidates the entries in the TLB 19 corresponding to all pages of a specific segment in a specific virtual address space. This validating operation is called a specific segment purge. The microinstruction M(3) directs to invalidate the entries in the TLB 19 corresponding to all pages in a specific address space. This invalidating operation is called a specific space purge. The microinstruction M(4) invalidates the entries in the TLB 19 (all of the entries in the TLB 19) corresponding to all of the pages in all of the virtual address spaces. This invalidating operation is called an all purge. The function fields F of the microinstructions M(1)-M(4) are F(1)-F(4).

It is assumed that a microinstruction to direct the execution of the TLB purge processing is read out of the MPM 11 and is loaded into the MIR 12. The function field F of the microinstruction stored in the MIR 12 is connected to a microinstruction decoder (not shown). The microinstruction decoder decodes a function field F from the MIR 12 to generate various control signals to control the related circuits. In a case where the microinstruction in the MIR 12 designates the TLB purge processing, as in this example, that is to say, the function field F from the MIR 12 belongs to any one of the function fields F(1)-F(4), the TLB purge data consisting of a space identifier SID, a segment number SN, and a page number PN is initially set in the AC 17 under control of the control signal from the microinstruction decoder. The space identifier SID initially set in the AC 17 represents a specific virtual address space when F=F(1), F=F(2), or F=F(3), and represents the first virtual address space (SID=0) when F=F(4). The segment number SN set in the AC 17 represents a specific segment when F=F(1) or F=F(2), and represents the first segment (SN=0) when F=F(3) or F=F(4). The page number PN set in the AC 17 represents a specific page when F=F(1), and represents the first page (PN=0) when F=F(2), F=F(3) or F=F(4).

The function field F of the microinstruction stored in the MIR 12 is also applied to the DEC 31 in the TLB control section 30. The DEC 31 decodes the function field F from the MIR 12 and produces the signal 34 of logic 1 and the signal 35 of logic 0 when the function field F designates the TLB purge processing, as in this example. The signal 35 is supplied to the OR gate 32 together with the TLB hit signal HT from the AND gate 27 in the TLB hit detector 20. When the signal 35 is logic 0, the logic level of the output signal from the OR gate 32 is coincident with that of the TLB hit signal HT. The output signal from the OR gate 32 is supplied to the AND gate 33, together with the signal 34 from the DEC 31 and the clock signal CLK1. When the signal 34 is logic 1, as in this example, the AND gate 33 is enabled according to the logic level of the TLB hit signal HT.

The signal 34 of logic 1 from the DEC 31 in the TLB control section 30 is supplied to the selector 18. When the signal 34 is logic 1, as in this example, i.e., in a rewriting mode for the TLB 19, the selector 18 selects the data (SID'+SN'+PN'+TLBADR) from the AC 17, not that from the AR 16. Of the data from the AC 17 selected by the selector 18, the TLB address TLBADR is supplied to the TLB 19. The TLB 19 is indexed by the TLB address TLBADR, thereby taking out the contents of the entry in the TLB 19 as specified by the TLB address TLBADR. The upper order space identifier SID', the upper order segment number SN', the upper order page number PN', and the valid flag V in the entry taken out of the TLB 19 are supplied to the TLB hit detector 20. Of the data supplied from the AC 17 selected by the selector 18, the data (SID'+SN'+PN') except for the TLB address TLBADR is also applied to the TLB hit detector 20. The COMP 21 detects whether or not the upper order space identifiers SID' derived from the selector 18 and the TLB 19 are coincident with each other. The COMP 22 detects whether or not the upper order segment numbers SN' from the circuit sections are coincident with each other. The COMP 23 detects whether or not the upper order page number PN' from the circuit sections are coincident with each other. The output signals (coincidence detection signal) from the COMPs 21-23 are respectively applied to the OR gates 24-26.

The function field F of the microinstruction stored in the MIR 12 is linked with the output signal 54 from the AND gate 52 in the execution control section 15 and an address field NA of the nano-instruction held in the NIR 14 at that time and is applied to the NPM 13. At this time, the output signal 54 is logic 0, as will be seen later, and the address field NA has all 0's (NA=0) in a logical state. The NPM 13 is addressed by a nano-address field NA as the linking data of the function field F, the signal 54, and the address field NA.

In this embodiment, the first nano-instruction NI(11) of the nano-program NP(1) for single purge processing is stored in the NPM 13 at the address represented by the linking data of the function field F(1), the output signal 54 of logic 0, and the address field NA having all 0's. The nano-program NP(1) includes the nano-instruction NI(11) and the nano-instruction NI(12). The nano-instruction NI(12) is stored in the NPM 13 at the address represented by the linking data of the function field F(1), the output signal 54 of logic 1, and the address field NA of all 0's.

Figure 7:
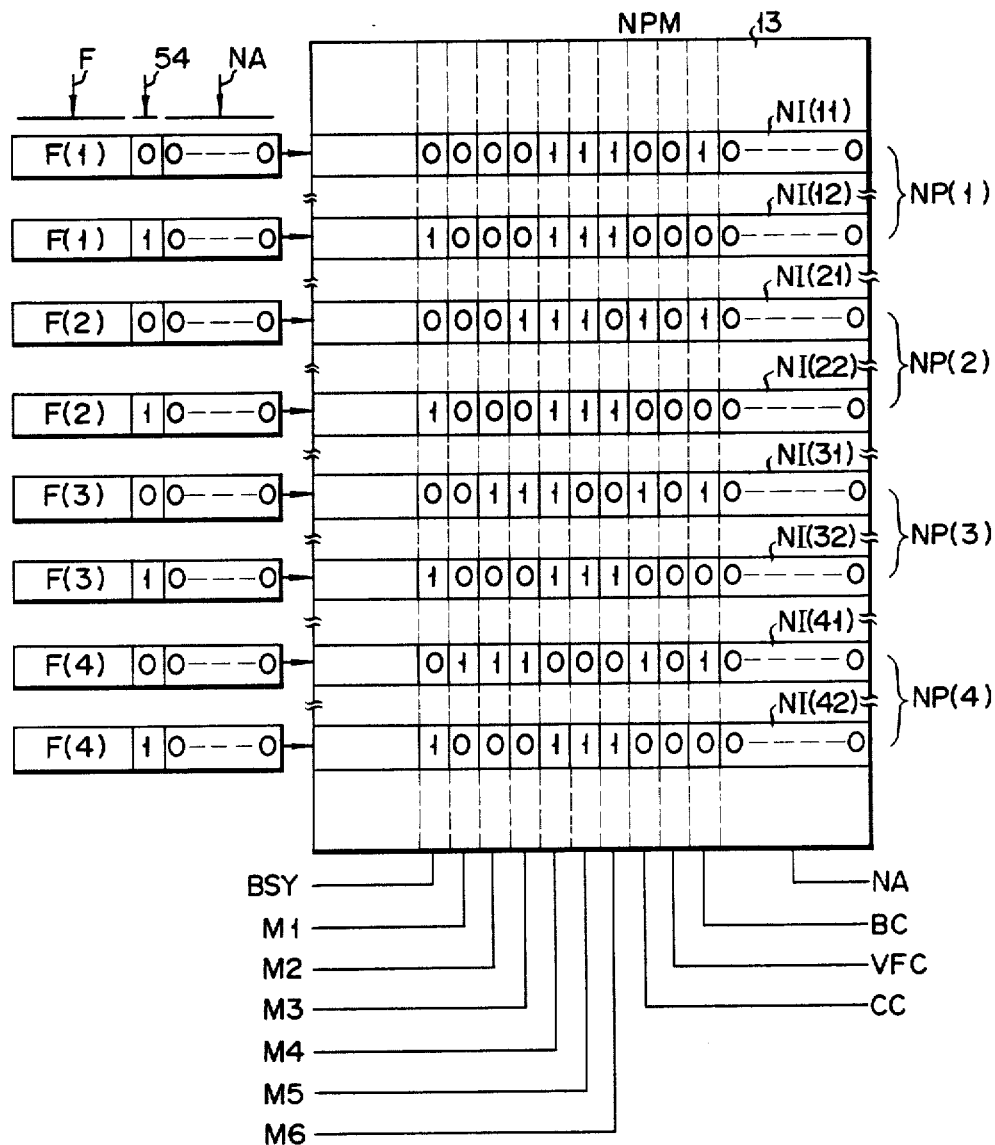
FIG. 7 shows a memory map of a nano-program memory (NPM) in the DPU of FIG. 1.

The first nano-instruction NI(21) of the nano-program NP(2) for the specific segment purge processing is stored in the NPM 13 at the address represented by the linking data of the function field F(2), the output signal 54 of logic 0, and the nano-address field NA of all 0's, as shown in FIG. 7. The nano-program NP(2) includes the nano-instruction IN(21) and a nano-instruction NI(22). The nano-instruction NI(22) is stored in the NPM 13 at the address represented by the linking data of the function field F(2), the output signal 54 of logic 1, and the nano-address field NA of all 0,s.

As shown in FIG. 7, the first nano-instruction NI(31) of the nano-program NP(3) for the specific space purge processing is stored in the NPM 13 at the address represented by the linking data of the function field F(3), the output signal 54 of logic 0, and the nano-address field NA of all 0's. The nano-program NP(3) includes the nano-instruction NI(31) and a nano-instruction NI(32). The nano-instruction NI(32) is stored in the NPM 13 at the address as represented by the linking data of the function field F(3), the output signal 54 of logic 1, and the nano-address field NA of all 0's.

The first nano-instruction NI(41) of the nano-program NP(4) for the specific space purge processing is stored in the NPM 13 at the address represented by the linking of the function field F(4), the output signal 54 of logic 0, and the nano-address field NA of all 0's, as shown in FIG. 7. The nano-program NP(4) includes the nano-instruction NI(41) and a nano-instruction NI(42). The nano-instruction NI(42) is stored in the NPM 13 at the address represented by the linking data of the function field F(4), the output signal 54 of 1, and the nano-address field NA of all 0's.

Assume now that the microinstruction loaded in the MIR 12 is for designating single purge. In this case, the function field F of the microinstruction M(1) is F(1). Accordingly, the nano-instruction NI(11) is first read out from the NPM 13. The nano-instruction NI(11) read out of the NPM 13 is loaded into the NIR 14. The busy bit BSY of the nano-instruction NI(11) is logic 0, as shown in FIG. 7. This logical state of the busy bit BSY indicates that the nano-instruction is being executed. Under this condition, it is prohibited for the next microinstruction read out from the MPM 11 to be loaded into the MIR 12.

The mask bits M1-M3 of the nano-instruction NI(11) are all 0's, as shown in FIG. 7. When the single purge is designated, the coincidence detection results of the COMPs 21-23 and the state of the valid flag V are evaluated by the AND gate 27, as in the case of the memory access. The result of the evaluation by the AND gate 27 is produced as a TLB hit signal HT.

The TLB hit signal HT from the AND gate 27 in the TLB hit detector 20 is supplied to the TLB control section 30. As described above, when the TLB purge processing is designated, the AND gate 33 in the TLB hit detector 20 is enabled according to the logical level of the TLB hit signal HT. Specifically, the AND gate 33 allows the clock signal CLK1 to pass therethrough as a write control signal 36 only when the TLB hit signal HT is logic 1. The write control signal 34 from the AND gate 33 in the TLB control section 30 is applied to the TLB 19. A valid flag control bit VFC from the NIR 14 is applied as write data to the field of the valid flag V in the TLB 19. When the control signal 34 is valid, a valid flag V of the entry in the TLB 19 as specified by the TLB address TLBADR in the data selected by the selector 18 is rewritten into a logic value represented by the valid flag control bit VFC from the NIR 14. In this example where the nano-instruction NI(11) is set in the NIR 14, the valid flag control bit VFC is logic 0, as shown in FIG. 7. Accordingly, in this case, a valid flag V of the entry in the TLB 19 as specified by the TLB address TLBADR in the TLB purge data as intially set in the AC 17, is rewritten into logic 0. This implies that the entry to be TLB purged is purged or made invalid.

The TLB address TLBADR as the lower 10 bits in the AC 17 is supplied to the execution control section 15. The lower five bits of the TLB address TLBADR are applied to the AND gate 42 in the execution control section 15. The gate 42 detects whether the lower five bits are all 1's or not. The succeeding four bits of the TLB address TLBADR are supplied to the AND gate 41 in the execution control section 15. The AND gate 41 checks whether the four bits are all 1's or not. The output signal from the AND gate 42, together with the mask bit M6 from the NIR 14, is supplied to the OR gate 46. When M6=0, a logic level of the output sigal of the OR gate 46 is coincident with that of the output signal from the AND gate 42. When M6=1, it is logic 1 without regard to the logic level of the output signal of the AND gate 42. The output signal from the AND gate 41, together with the mask bit M5 from the NIR 14, is applied to the OR gate 45. When M5=0, the logic level of the output signal from the OR gate 45 is coincident with that of the output signal from the AND gate 41. When M5=1, it is logic 1 irrespective of a logic level of the output signal from the AND gate 41. The most significant bit of the TLB address TLBADR, together with the mask bit M4 from the NIR 14, is applied to the OR gate 44. When M4=0, a logic level of the output signal from the OR gate 44 is coincident with that of the most significant bit of the TLB address TLBADR, when M4=0. When M4=1, it is logic 1 irrespective of a logic level of the most significant bit of the TLB address TLBADR. The output signals from the OR gates 44-46 are supplied to the AND gate 43. The AND gate 43 produces a signal of logic 1 representing that the termination condition of the nano-program holds only when the output signals from the OR gates 44-46 are logic 1.

The nano-instruction NI(11) is now set in the NIR 14, as stated above. The mask bits M4-M6 of the nano-instruction NI(11) are all 1's, as shown in FIG. 7. In this case, the output signals from the OR gates 44-46 are logic 1 irrespective of the TLB address TLBADR, and the AND gate 43 produces a signal of logic 1 representing the termination of the nanc-program. The output signal from the AND gate 43, together with the branch control bit BC, is supplied to the AND gate 52. When the output signal from the AND gate 43 is logic 1, the AND gate 52 permits the branch control bit BC to pass therethrough as the output signal 54. When the output signal of the AND gate 43 is logic 0, the AND gate 52 produces the output signal 54 of logic 0 irrespective of the branch control bit BC. As described above, when the nano-instruction NI(11) is stored in the NIR 14, the output signal from the AND gate 43 is logic 1 and the branch control bit BC is logic 1, as shown in FIG. 7. In this case, the output signal 54 from the AND gate 52 is logic 1.

The output signal 54 from the AND gate 52 in the execution control section 15 is coupled with the function field F from the MIR 12 and the nano-address field NA from the NIR 14, thereby designating an address of the nano-instruction to be executed. As a result, the specified nano-instruction is read out from the NPM 13. In this example, the function field F from the MIR 12 is F(1), the output signal 54 is logic 1, and the nano-address field NA from the NIR 14 is all 0's. In this case, as seen from FIG. 7, the final nano-instruction NI(12) in the nano-program NP(1) is read out of the NPM 13. The nano-instruction NI(12) is loaded into the NIR 14. The busy bit BSY in the nano-instruction NI(12) is logic 1, as shown in FIG. 7, and this logic state indicates the end of the nano-program execution. When the busy bit BSY is logic 1, the prohibition against the execution of the next microinstruction is removed.

In the present embodiment, the nano-program in the NPM 13 is used only for TLB purge processing and TLB replace processing. When, subsequent to single purge processing, the memory access, for example, is carried out, the contents of the NIR 14 remain unchanged. In this case, the mask bits M1–M3 of the nano-instruction NI(12) in the NIR 14 are supplied to the TLB hit detector 20. The mask bits M1–M3 in the nano-instruction NI(12) are all 0's, as shown in FIG. 7, to direct the evaluation of the coincident detection results of the COMPs 21–23. This is true for the final nano-instruction of the nano-program for the TLB purge processing other than the single purge processing and the nano-program for the TLB replace processing.

The description to follow shows a case when the microinstruction loaded in the MIR 12 is the microinstruction M(2) designating a specific segment purge. In this case, the function field F in the microinstruction M(2) is F(2). Accordingly, a nano-instruction NI(21) is first read out from the NPM 13, and is loaded into the NIR 14. As shown in FIG. 7, the nano-instruction NI(21) has the same structure as that of the nano-instruction NI(11), except that the mask bit M3 is logic 1, and the mask bit M6 is logic 0. When the mask bit M3 is logic 1, a logic level of the output signal from the OR gate 26 in the TLB hit detector 20 is logic 1 without regard to the logic level of the output signal of the COMP 23. This logic state implies that the coincidence detection result by the COMP 23, that is, the result of comparison of the upper order page numbers PN', is ignored. The mask bits M1 and M2 are both logic 0, and the the coincidence detection results by the COMPs 21 and 22 are evaluated, as in the case of the single purge. In the case of the specific segment purge, the coincidence detection results by the COMPs 21 and 22, and a state of the valid flag V from the TLB 19 are evaluated by the AND gate 27. The result of the evaluation by the AND gate 27 is output as a TLB hit signal HT. The TLB control section 30 applies a write control signal 36 to the TLB 19, only when the TLB hit signal HT from the AND gate 27 in the TLB hit detector 20 is logic 1. The valid flag V of the entry in the TLB 19 specified by the TLB address TLBADR from the AC 17 is rewritten to logic 0 representing the valid flag control bit VFC.

The mask bit M6 of the nano-instruction NI(21) is logic 0. When M6=0, the logic level of the output signal from the OR gate 46 is coincident with that of the output signal from the AND gate 42. In this case, the AND gate 43 evaluates the result of detection, i.e., whether or not the lower five bits of the TLB address TLBADR from the AC 17 (the portion of the page number PN to be used for indexing the TLB 19) are all 1's. The mask bits M4 and M5 are both logic 1, and hence a state of the most significant bit of the TLB address TLBADR and the result of the all 1's detection by the AND gate 41 are ignored. As described above, in the case of the specific segment purge, the page number PN initially set in the TLB 19 represents the first page (PN=0). In this case, the output signal from the AND gate 42 is logc 0. When the output signal from the AND gate 42 is logic 0 and the mask bit M6 from the NIR 14 is logic 0, the output signal from the OR gate 46 is logic 0, and the output signal from the AND gate 43 is also logic 0.

The output signal from the AND gate 43 is applied to the AND gate 53 via the inverter 51. Also applied to the AND gate 53 are the counter control bit CC and the clock signal CLK1. The AND gate 53 is enabled only when the output signal from the AND gate 43 is logic 0 and when the counter control bit CC from the NIR 14 is logic 1. The counter control bit CC from the nano-instruction NI(21) is logic 1. During the execution of the nano-instruction NI(21), the AND gate 53 permits the clock signal CLK2 to pass therethrough as the signal 55, only when the output signal from the AND gate 43 is logic 0. The same thing is true for a nano-instruction NI(31) and a nano-instruction NI(41), which will be described later. The output signal 55 from the AND gate 53 in the execution control section 15 is coupled with the clock terminal of the AC 17. When the output signal 55 is valid, the AC 17 is incremented by one at the timing of the output signal 55.

The output signal from the AND gate 43 is connected to the AND gate 52. The branch control bit BC from the NIR 14 is also applied to the AND gate 52. When the specific segment purge is designated, the output signal from the AND gate 43 continues its logic state of 0, until the lower five bits of the TLB address TLBADR from the AC 17, i.e., the lower five bits of the output data from the AC 17, are all 1's. The same nano-instruction as the nano-instruction under execution is read out again from the NPM 13.

When the specific segment purge is designated, the AC 17 is incremented by the execution control section 15 until the lower five bits of the output data from the AC 17 (the lower five bits of the TLB address TLBADR) are all 1's. With the increment of the AC 17, the corresponding entries in the TLB 19 are sequentially indexed, to repeatedly check whether the entry to be invalidated is present or not. If such an entry is present (HT=1), the corresponding valid flag V is set to logic 0, i.e., a logic state directing entry invalidating. As a result, the entries in the TLB 19 corresponding to all the pages in a specific segment in a specific virtual space are all made invalid. When the lower five bits of the TLB address TLBADR from the AC 17 are all 1's, the output signal from the AND gate 43 is logic 1. As a result, the AND gate 53 is disabled to prohibit the incrementing operation of the AC 17. The AND gate 52 permits the branch control bit BC of logic 1 from the NIR 14 to pass therethrough as the signal 54. As a result, the final nano-instruction NI(22) in the nano-program NP(2) is read out of the NPM 13, with an address consisting of the function field F(2) from the MIR 12, the signal 54 of logic 1, and the nano-address field NA of all 0's from the NIR 14.

A case where the microinstruction loaded into the MIR 12 is the microinstruction M(3) to direct the specific address space purge will be described. In this case, the function field F of the microinstruction M(3) is F(3). Accordingly, the nano-instruction NI(31) is first read out from the NPM 13, and is loaded into the NIR 14. The nano-instruction NI(31) is the same as the nano-instruction NI(21), except that the mask bit M2 is logic 1 and the mask bit M5 is logic 0. Accordingly, when the nano-instruction NI(31) is executed, the TLB hit detector 20 evaluates only the coincidence detection result by the COMP 21, i.e., the result of comparing the upper order space identifiers SID', of the coincidence detection results of the COMPs 21–23. In other words, in the case of the specific address space purge, the coincidence detection result by the COMP 21 and a state of the valid flag V from the TLB 19 are evaluated by the AND gate 27. In the execution control section 15, since M4=1 and M5=M6=0, only the detection result of all the 0's by the AND gates 41 and 42 is evaluated. Thus, wen the specific address space purge is designated, the AC 17 is incremented by the output signal 55 of the AND gate 53 until the lower nine bits of the output data from the AC 17, i.e., the lower nine bits of the TLB address TLBADR, are all 1's. With the increment of the AC 17, the corresponding entries of the TLB 19 are sequentially indexed to repeatedly check whether the entry to be made invalid is present or not. If the entry to be invalidated is present (HT=1), the corresponding valid flag V is set to logic 0, i.e., a logic state directing entry invalidation. As a result, all of the entries i the TLB 19 corresponding to the pages in all segments of a specific virtual address space are made invalid. When the lower nine bits of the TLB address TLBADR from the AC 17 are all 1's, the output signal from the AND gate 43 is logic 1. As a result, the AND gate 53 is disabled to prohibit the incrementing operation of the AC 17. The AND gate 52 permits the branch control bit BC of logic 1 from the NIR 14 to pass therethrough as the signal 54. As a result, the final nano-instruction NI(32) in the nano-program NP(3) is read out the NPM 13, with an address consisting of the function field F(3) from the MIR 12, the signal 54 of logic 1, and the nano-address field NA of all 0's from the NIR 14.

A description will be given on a case where the micro-instruction loaded in the MIR 12 is the microinstruction M(4) for directing the execution of the all purge. In this case, the function field F of the microinstruction M(4) is F(4). Accordingly, the nano-instruction NI(41) is read out from the NPM 13, and is loaded into the NIR 14. As shown in FIG. 7, the nano-instruction NI(41) is the same as the nano-instruction NI(31) except that the mask bit M1 is logic 1 and the mask bit M4 is logic 0. Therefore, when the nano-instruction NI(41) is executed, in the TLB hit detector 20 the coincidence detection results of the COMPs 21–23 are all ignored. In the case of the all purge, only a state of the valid flag V from the TLB 19 is evaluated by the AND gate 27. In the execution control section 15, since M4=M5=M6=0, the most significant bit from the TLB 19 and the detection result of all 0's by the AND gates 41 and 42 are all evaluated. In other words, whether all bits of the TLB address TLBADR from the AC 17 are all 1's or not is detected by the AND gate 43. Accordingly, when the all purge is designated, the AC 17 is incremented one by one until the lower ten bits of the output data of the AC 17, i.e., the TLB address TLBADR, are all 1's. With the increment of the AC 17, the corresponding entries in the TLB 19 are sequentially indexed to repeatedly check whether the entry to be made invalid is present or not. When such entry is present (HT=1), the corresponding valid flag V is set to logic 0, i.e., a logical state to direct the entry invalidation. As a result, the entries in the TLB 19 corresponding to the pages in all segments of any virtual address space, that is, all of the entries in the TLB 19, are made invalid. When all bits of the TLB address TLBADR from the AC 17 are all 1's, the output signal from the AND gate 43 is logic 1. As a result, the AND gate 53 is disabled to prohibit the incrementing operation of the AC 17. The AND gate 52 permits the branch control bit BC of logic 1 from the NIR 14 to pass therethrough as the signal 54. As a result, the final nano-instruction NI(42) in the nano-program NP(4) is read out the NPM 13, with an address consisting of the function field F(4) from the MIR 12, the signal 54 of logic 1, and the nano-address field NA of all 0's from the NIR 14.

Finally, a case where the microinstruction loaded in the MIR 12 is the microinstruction for directing the execution of TLB replace processing will be described in brief. In this case, the TLB-replace data, with the same structure as the TLB purge, is intially set in the AC 17. Further, since the DEC 31 in the TLB control section 30 produces the signal 35 of logic 1, the output data derived from the AC 17 is selected by the selector 18. The TLB repace processing is executed under control of the nano-program in the NPM 13, as in the case of TLB purge processing. Data writing into the TLB 19 by the TLB control section 30 is controlled as in the case of TLB purge processing. In the case of the microinstruction for directing the execution of the TLB replace processing, the output signal 35 from the DEC 31 is logic 1, as previously stated. In this case, the output signal from the OR gate 32 is logic 1, irrespective of a logic state of the TLB hit signal HT derived from the AND gate 27 in the TLB hit detector 20. Accordingly, when the TLB replace processing is designated, the writing into the entry in the TLB 19 as specified by the TLB address TLBADR from the AC 17 is unconditionally performed. The valid flag control bit VFC of the nano-instruction for the TLB replace is set to logic 1.

While a specific embodiment of the present invention has been described, the embodiment may variously be modified and changed within the scope of the invention. For example, the AC (address counter) 17 may be replaced by a counter in which the TLB address TLBADR of the TLB purge data is initially set and a register in which the remaining the TLB purge data is initially set. For the DPU (data processing unit) in which the the lower bits of the space identifier SID are used for the upper bits of the TLB address TLBADR, it is sufficient to provide in the termination detector 40 (FIG. 6) an AND gate for detecting whether those bits are all 1's or not and to supply the output signal from this AND gate and the mask bit M4 to the OR gate 44. For the DPU applied fo the ordinary virtual storage control type computer, the components relating to the space identifier SID, such as the COMP 21 and the OR gate 24 in FIG. 1, and the mask bits M1 and M4 of the nano-instruction shown in FIG. 2, and the OR gate 44 in FIG. 6 may be omitted.

What is claimed is:

1. A data processing unit with a translation lookaside buffer purge function, applied with a virtual storage control system, comprising:

first register means for holding a virtual address having fields including a first segment number, a first page number, and a displacement in a memory access mode;

second register means with a counter function for initially setting translation lookaside buffer purge data having fields including a second segment number and a second page number in a translation lookaside buffer purge processing mode;

update control means for updating part of said translation lookaside buffer purge data by controlling said second register means according to a specifying condition of said translation lookaside buffer purge processing mode;

select means for selecting output data of said first register means except said displacement or output data of said second register means;

a translation lookaside buffer to be indexed by a predetermined field of data output from said select means, said translation lookaside buffer including a plurality of entries, each having a validity-specifying flag for indicating whether the entry is valid, and further having real address data;

field-specifying means for specifying the fields requiring detection of mutual coincidence between the real address data read from said translation lookaside buffer and the output data from said select means except for said predetermined field;

translation lookaside buffer hit-detecting means for detecting the coincidence between the field of the real address data read from said translation lookaside buffer specified by said field-specifying means and the field of the output data from the select means, said field having been specified by said field-specifying means so as to determine whether the real address data from said translation lookaside buffer is intended real address data in accordance with the result of the detection and the validity-specifying flag from said translation lookaside buffer, said translation lookaside buffer hit-detecting means serving to determine whether the real address data from said translation lookaside buffer is the intended real address data in accordance with the validity-specifying flag from said translation lookaside buffer in the case where the fields have not been specified by said field-specifying means; and translation lookaside buffer control means for changing the validity-specifying flag of the entry of said translation lookaside buffer to an invalidity-specifying flag when said translation lookaside buffer hit-detecting means detects that the real address data from said translation lookaside buffer is the intended real address data and that the data processing unit is set to the translation lookaside buffer purge processing mode.

2. The data processing unit according to claim 1, in which said select means selects the output data of said first register means other than said displacement in said memory access mode, and selects the output data of said second register means in said translation lookaside buffer purge processing mode.

3. The data processing unit according to claim 2, in which said first and second segment numbers each include first and second segment fields, said first and second page numbers each include first and second page fields, the predetermined field of the output data of said select means includes said second segment field and second page field, and the predetermined field of the real address data read out of said translation lookaside buffer and the output data of said select means, other than said predetermined field, each include said first segment field and said first page field.

4. The data processing unit according to claim 3, in which said field-specifying means specifies the detection of coincidence of said first segment fields and of said first page fields in a first translation lookaside buffer purge processing mode to invalidate an entry in said translation lookaside buffer corresponding to a specific page in a specific segment, specifies the coincidence detection of only said first segment fields in a second translation lookaside buffer purge processing mode to invalidate the respective entries in said translation lookaside buffer corresponding to a specific segment, and specifies no need for the coincidence detection of said first segment fields and said first page fields in a third translational lookaside buffer purge processing mode to invalidate all of the entries in said translation lookaside buffer.

5. The data processing unit according to claim 4, in which said field-specifying means supplies to said translation lookaside buffer hit detecting means a first mask signal to specify the coincidence detection of said first segment fields and a second mask signal to specify the coincidence detection of said first page fields according to the contents of said translation lookaside buffer purge processing.

6. The data processing unit according to claim 5, in which said translation lookaside buffer hit-detecting means includes:

a first comparator for comparing the first segment fields of the real address data read from said translation lookaside buffer and the output data of said select means;

a second comparator for comparing the first page fields of the real address data read from said translation lookaside buffer and the output data of said select means;

a first gate for masking the comparison result of said first comparator according to the first mask signal from said field-specifying means;

a second gate for masking the comparison result of said second comparator according to the second mask signal from said field-specifying means; and a third gate for producing a translation lookaside buffer hit signal indicating whether or not the real address data from said translation lookaside buffer is the intended real address data on the basis of the output signals from said first and second gates and the validity-specifying flag from said translation lookaside buffer.

7. The data processing unit according to claim 4, in which said second register means includes a counter for holding, in the first, second and third translation lookaside buffer purge processing modes, at least said second segment field and said second page field of said translation lookaside buffer purge data in such a manner that said second page field occupies the lower order field.

8. The data processing unit according to claim 7, in which the lower order field of said second segment number is said second segment field and the lower order field of said second page number is said second page field.

9. The data processing unit according to claim 8, in which an initial value of said second segment number specifies a specific segment in said first and second translation lookaside buffer purge processing modes and the first segment in said third translation lookaside buffer purge processing mode, and an initial value of said second page number specifies a specific page in said first translation lookaside buffer purge processing mode and the first page in said second and third translation lookaside buffer purge processing modes.

10. The data processing unit according to claim 9, in which said update control means increments said counter one by one in said second translation lookaside buffer purge processing mode until the bits of said second page field in said counter are all 1's, and in said third translation lookaside buffer purge processing mode until the bits of said second segment field and said second page field both stored in said second counter are all 1's.

11. A data processing unit with a translation lookaside buffer purge function, applied with a multiple virtual storage control system, comprising:
   first register means for holding a first space identifier, and a virtual address having fields including a first segment number, a first page number, and a displacement in a memory access mode;
   second register means with a counter function for initially setting translation lookaside buffer purge data having fields including a second space identifier, a second segment number and a second page number in a translation lookaside buffer purge processing mode;
   update control means for updating part of said translation lookaside buffer purge data by controlling said second register means according to a specifying condition of said translation lookaside buffer purge processing mode;
   select means for selecting output data of said first register means except said displacement or output data of said second register means;
   a translation lookaside buffer to be indexed by a predetermined field of data output from said select means, said translation lookaside buffer including a plurality of entries, each having a validity-specifying flag for indicating whether the entry is valid, and further having real address data;
   field-specifying means for specifying the fields requiring detection of mutual conincidence between the real address data read from said translation lookaside buffer and output data from said select means except for said predetermined field;
   translation lookaside buffer hit-detecting means for detecting the coincidence between the field of the real address data read from said translation lookaside buffer specified by said field-specifying means and the field of the output data from the select means, said field having been specified by said field-specifying means so as to determine whether the real address data from said translation lookaside buffer is intended real address data in accordance with the result of the detection and the validity-specifying flag from said translation lookaside buffer, said translation lookaside buffer hit-detecting means serving to determined whether the real address data from said translation lookaside buffer is the intended real address data in accordance with the validity-specifying flag from said translation lookaside buffer in the case where the fields have not been specified by said field-specifying means; and translation lookaside buffer control means for changing the validity-specifying flag of the entry of said translation lookaside buffer to an invalidity-specifying flag when said translation lookaside buffer hit-detecting means detects that the real address data from said translation lookaside buffer is the intended real address data and that the data processing unit is set to the translation lookaside buffer purge processing mode.

12. The data processing unit according to claim 11, in which said select means selects the output data of said first register means other than said displacement in said memory access mode, and selects the output data of said second register means in said translation lookaside buffer purge processing mode.

13. The data processing unit according to claim 12, in which said first and second space identifiers each include first and second space identifier fields, said first and second segment numbers each include first and second segment fields, said first and second page numbers each include first and second page fields, the predetermined field of the output data of said select means includes said second space identifier field, said second segment field and second page field, and the predetermined field of the real address data read out of said translation lookaside buffer and the output data of said select means, other than said predetermined field, each include said first space identifier field, said first segment field and said first page field.

14. The data processing unit according to claim 13, in which said field-specifying means specifies the detection of coincidence of said first space identifier fields, said first segment fields and said first page fields in a first translation lookaside buffer purge processing mode to invalidate an entry in said translation lookaside buffer corresponding to a specific page in a specific segment in a specific virtual address space, specifies the coincidence detection of only said first space identifier fields and said first segment fields in a second translation lookaside buffer purge processing mode to invalidate the respective entries in said translation lookaside buffer corresponding to a specific segment in a specific virtual address space, specifies the coincidence detection of only said first space identifier fields in a third translation lookaside buffer purge processing mode to invalidate the respective entries in said translation lookaside buffer corresponding to a specific virtual address space, and specifies no need for the coincidence detection of said first space identifier fields, said first segment fields and said first page fields in a fourth translation lookaside buffer purge processing mode to invalidate all of the entries in said translation lookaside buffer.

15. The data processing unit according to claim 14, in which said field specifying means supplies to said translation lookaside buffer hit-detecting means a first mask signal to specify the coincidence detection of said first space identifier fields, a second mask signal to specify the coincidence detection of said first segment fields, and a third mask signal to specify the coincidence of detection of said first page fields according to the contents of said translation lookaside buffer purge processing.

16. The data processing unit according to claim 15, in which said translation lookaside buffer hit-detecting means includes:
   a first comparator for comparing said first space identifier fields of said real address data read from said translation lookaside buffer and the output data of said select means;

a second comparator for comparing the first segment fields of the real address data read from said translation lookaside buffer and the output data of said select means;

a third comparator for comparing the first page fields of the real address data read out from said translation lookaside buffer and the output data of said select means;

a first gate for masking the comparison result of said first comparator according to the first mask signal from said field-specifying means;

a second gate for masking the comparison result of said second comparator according to the second mask signal from said field-specifying means;

a third gate for masking the comparison result of said third comparator according to the third mask signal from said field specifying means; and a fourth gate for producing a translation lookaside buffer hit signal indicating whether or not the real address data from said translation lookaside buffer is the intended real address data on the basis of the output signals from said first, second and third gates and the validity-specifying flag from said translation lookaside buffer.

17. The data processing unit according to claim 14, in which said second register means includes a counter for holding, in the first, second, third and fourth translation lookaside buffer purge processing modes, at least said second identifier field, said second segment field and said second page field of said translation lookaside buffer purge data in such a manner that said second page field occupies the lower order field and said second segment field occupies the field succeeding said second page field on the upper order side.

18. The data processing unit according to claim 17, in which the lower order field of said second space identifier is said second space identifier field, the lower order of said second segment number is said second segment field and the lower order field of said second page number is said second page field.

19. The data processing unit according to claim 18, in which an initial value of said second space identifier is a specific virtual address space in said first, second and third translation lookaside buffer purge processing modes and specifies the first virtual address space in said fourth translation lookaside buffer purge processing mode, an initial value of said second segment number specifies a specific segment in said first and second translation lookaside buffer purge processing modes and specifies the first segment in said third and fourth translation lookaside buffer purge processing modes, and an initial value of said second page number specifies a specific page in said first translation lookaside buffer purge processing mode and the first page in said second, third and fourth translation lookaside buffer purge processing modes.

20. The data processing unit according to claim 19, in which said update control means increments said counter one by one in said second translation lookaside buffer purge processing mode, until the bits of said second page field in said counter are all 1's, in said third translation lookaside buffer purge processing mode until the bits of said second segment field and second page field both stored in said counter are all 1's, and in said fourth translation lookaside buffer purge processing mode until the bits of said second identifier field, second segment field and second page field all stored in said counter are all 1's.

* * * * *